(12) United States Patent
Wilden et al.

(10) Patent No.: US 11,447,838 B2
(45) Date of Patent: Sep. 20, 2022

(54) METHOD AND DEVICE FOR HEAT TREATING A METAL COMPONENT

(71) Applicant: SCHWARTZ GMBH, Simmerath (DE)

(72) Inventors: Frank Wilden, Simmerath (DE); Andreas Reinartz, Monschau (DE); Jörg Winkel, Nideggen-Schmidt (DE)

(73) Assignee: SCHWARTZ GMBH, Simmerath (DE)

( * ) Notice: Subject to any disclaimer, the term of this patent is extended or adjusted under 35 U.S.C. 154(b) by 461 days.

(21) Appl. No.: 16/072,681

(22) PCT Filed: Jan. 25, 2017

(86) PCT No.: PCT/EP2017/051509
§ 371 (c)(1),
(2) Date: Jul. 25, 2018

(87) PCT Pub. No.: WO2017/129601
PCT Pub. Date: Aug. 3, 2017

(65) Prior Publication Data
US 2018/0363079 A1    Dec. 20, 2018

(30) Foreign Application Priority Data

Jan. 25, 2016 (DE) .................... 10 2016 201 024.7
Jan. 25, 2016 (DE) .................... 10 2016 201 025.5
(Continued)

(51) Int. Cl.
*C21D 1/673* (2006.01)
*C21D 9/00* (2006.01)
(Continued)

(52) U.S. Cl.
CPC .......... *C21D 1/673* (2013.01); *C21D 9/0068* (2013.01); *C21D 9/48* (2013.01); *C22C 38/002* (2013.01);
(Continued)

(58) Field of Classification Search
None
See application file for complete search history.

(56) References Cited

U.S. PATENT DOCUMENTS 5,972,134 A * 10/1999 Buschsieweke ......... C21D 8/02
148/567
7,998,289 B2 * 8/2011 Brodt ..................... B21D 53/88
148/567
(Continued)

FOREIGN PATENT DOCUMENTS

| CN | 102453796 | 4/2012 |
|----|-----------|--------|
| DE | 10208216 | 3/2003 |

(Continued)

OTHER PUBLICATIONS

Japanese Office Action dated Jan. 5, 2021 in JP Application No. 2018-538754.

*Primary Examiner* — Alexandra M Moore
(74) *Attorney, Agent, or Firm* — Occhiuti & Rohlicek LLP

(57) ABSTRACT

The invention relates to a method and to a device for heat treating a metal component. The method comprises at least the following steps: a) heating the component; b) setting a temperature difference between at least one first sub-region and at least one second sub-region of the component; c) at least partially forming and/or cooling the component in a press hardening tool; and d) mechanically post-processing the at least one first sub-region of the component.

7 Claims, 1 Drawing Sheet

(30) Foreign Application Priority Data

| | | |
|---|---|---|
| Feb. 9, 2016 | (DE) | 10 2016 201 936.8 |
| Feb. 23, 2016 | (DE) | 10 2016 202 766.2 |
| Oct. 27, 2016 | (DE) | 10 2016 120 605.9 |

(51) Int. Cl.

| | |
|---|---|
| *C22C 38/04* | (2006.01) |
| *C22C 38/00* | (2006.01) |
| *C21D 9/48* | (2006.01) |
| *B21D 24/16* | (2006.01) |
| *B21D 22/20* | (2006.01) |
| *B62D 25/04* | (2006.01) |
| *B23P 9/00* | (2006.01) |

(52) U.S. Cl.
CPC ............ *C22C 38/04* (2013.01); *B21D 22/208* (2013.01); *B21D 24/16* (2013.01); *B23P 9/00* (2013.01); *B62D 25/04* (2013.01); *C21D 2221/00* (2013.01); *C21D 2261/00* (2013.01); *Y10S 148/902* (2013.01)

(56) References Cited

U.S. PATENT DOCUMENTS

| | | | |
|---|---|---|---|
| 10,519,523 B2 | 12/2019 | Wada | |
| 2008/0036124 A1* | 2/2008 | Buschsieweke | C21D 1/18 |
| | | | 266/103 |
| 2009/0320968 A1* | 12/2009 | Boeke | C21D 1/34 |
| | | | 148/546 |
| 2010/0300584 A1* | 12/2010 | Buschsieweke | F27B 9/028 |
| | | | 148/530 |
| 2011/0283851 A1* | 11/2011 | Overrath | B21D 22/00 |
| | | | 83/15 |
| 2011/0315281 A1* | 12/2011 | Charest | C22F 1/00 |
| | | | 148/567 |
| 2012/0060982 A1* | 3/2012 | Bohner | C21D 1/673 |
| | | | 148/653 |
| 2012/0091758 A1 | 4/2012 | Zimmermann et al. | |
| 2012/0318415 A1 | 12/2012 | Zimmermann et al. | |
| 2015/0299817 A1* | 10/2015 | Shimotsu | C21D 11/005 |
| | | | 148/566 |

FOREIGN PATENT DOCUMENTS

| | | |
|---|---|---|
| DE | 102009050623 | 5/2010 |
| DE | 102010049205 A1 | 4/2012 |
| DE | 102014201259 | 7/2015 |
| EP | 1715066 | 10/2006 |
| EP | 2366805 | 9/2011 |
| JP | 2006104526 A | 4/2006 |
| JP | 2013515618 A | 5/2013 |
| JP | 2014147963 A | 8/2014 |
| WO | 2010150683 A1 | 12/2010 |
| WO | 2013137308 A1 | 9/2013 |

\* cited by examiner

METHOD AND DEVICE FOR HEAT TREATING A METAL COMPONENT

CROSS REFERENCE TO RELATED APPLICATIONS

This application is a National Phase under 35 U.S.C. 371 of International Application No. PCT/EP2017/051509 filed on Jan. 25, 2017, which claims priority to German Application No. 10 2016 201 024.7 filed Jan. 25, 2016, German Application No. 10 2016 201 025.5 filed Jan. 25, 2016, German Application No. 10 2016 201 936.8 filed Feb. 9, 2016, German Application No. 10 2016 202 766.2 filed Feb. 23, 2016 and German Application No. 10 2016 120 605.9 filed Oct. 27, 2016 the contents of which are hereby incorporated by reference in their entirety.

The invention relates to a method and to a device for heat treating a metal component. The invention is used, in particular, during the partial hardening of optionally pre-coated components, made preferably of a high-strength manganese-boron steel.

To produce safety-relevant vehicle body parts made of sheet steel, it is generally required to harden the sheet steel while or after it is formed into the body part. For this purpose, a heat treatment method referred to as "press hardening" has established itself. In this process, the sheet steel, which is generally provided in the form of a blank, is initially heated in a furnace and thereafter is cooled during the forming operation in a press, whereby it is hardened.

Due to heating and press hardening, the component in general undergoes an (albeit small) geometric change compared to the non-heated state. Usually, this requires trimming of the sheet steel to the desired final contour after press hardening. Subsequent trimming can generally only be dispensed with if the tolerance specification for the component to be produced is so broad that this change is still permissibly within the tolerances. In the typical fields of application of press hardening, however, the permissible tolerance specifications are often narrower.

Moreover, it must be taken into account that the tensile strength of steel sheets after press hardening is generally more than 1000 MPa [megapascal]. As a result, the hardened components can only be cut using special methods. One method that can generally be applied for this purpose is the cutting of hardened steel, or hard cutting. This process, however, requires tools able to sever steel having tensile strength of more than 1000 MPa. Cutting hardened steel not only adds to the manufacturing chain, but the tools required for this purpose also involve high investment costs, are subject to high wear and are maintenance-intensive. Cutting hardened steel has therefore not proven to be of value in industrial series production.

One method that is common in industrial series production is laser cutting. Hardened components are trimmed to the desired final contour by way of at least one laser beam. Laser cutting, however, has the disadvantage that it generally entails long cycle times, high energy costs and high investment costs.

Proceeding from this, it is the object of the present invention to at least partially solve the problems described with regard to the prior art. In particular, a method and a device for heat treating a metal component are to be provided, which allow a press hardened component having precise contours to as great an extent as possible to be manufactured in industrial series production. Moreover, it should be possible to carry out or operate the method and the device at the lowest energy costs possible and/or the implementation and/or production should have the lowest investment costs possible. Moreover, in particular, the method and the device are to enable a short cycle time to as great an extent as possible.

These objects are achieved by the features of the independent claims. Further advantageous embodiments of the solution disclosed herein are described in the dependent claims. It should be noted out that the features listed individually in the dependent claims can be combined with one another in any arbitrary, technologically meaningful manner and define further embodiments of the invention. Furthermore, the features described in the claims are specified and explained in greater detail in the description, wherein further preferred embodiments of the invention are presented.

A method according to the invention for heat treating a metal component comprises at least the following steps:
a) heating the component;
b) setting a temperature difference between at least one first sub-region and at least one second sub-region of the component;
c) at least partially forming and/or cooling the component in a press hardening tool; and
d) mechanically post-processing the at least one first sub-region of the component.

The indicated sequence of method steps a), b), c) and d) is derived with a regular process of the method. Individual or multiple of the method steps may be carried out simultaneously, consecutively and/or at least partially simultaneously. The method is preferably carried out using a device disclosed herein. The disclosed method is used, in particular, to produce a press hardened component having precise contours to as great an extent as possible.

The disclosed method, in a particularly advantageous manner, allows a press hardened component having precise contours to as great an extent as possible to be produced in industrial series production. This is made possible, in particular, in that the component, prior to the post-processing operation, undergoes a partially differing heat treatment in such a way that a region of the component possibly requiring post-processing is given lower strength than at least one other region of the component. This provides that advantage that the post-processing operation can be carried out mechanically, in particular without high tooling wear, so that energy cost- and investment cost-intensive laser cutting can be dispensed with. Mechanical post-processing can take place comparatively quickly, so that the method moreover, in particular, allows as short a cycle time as possible.

The metal component is preferably a metal blank, a sheet steel or an at least partially preformed semi-finished product. The metal component is preferably made with or of a (hardenable) steel, for example a boron (manganese) steel, such as that with the designation 22MnB5. It is furthermore preferred that the metal component is provided or pre-coated with a (metal) coating at least to a large degree. For example, the metal coating may be a coating (predominantly) comprising zinc, or a coating (predominantly) comprising aluminum and/or silicon, and in particular what is known as an aluminum/silicon (Al/Si) coating.

In step a), the (entire) component is heated, in particular in a first furnace. Preferably, the component is heated homogeneously, uniformly and/or evenly in the first furnace. It is furthermore preferred that the component is heated in the first furnace (exclusively) by way of radiant heat, for example by at least one electrically operated heating element (not making physical and/or electrical contact with the component), such as a heating loop and/or a heating wire, and/or by at least one (gas-heated) radiant tube.

According to an advantageous embodiment, it is proposed that the component is heated in step a) by way of radiant heat and/or convection by at least 500 K [Kelvin], preferably by at least 700 K or even by at least 800 K.

Preferably, the component is heated in step a) in a contactless manner, and in particular without heat-conducting and/or electrical contact with an electrically operated heating element.

Preferably, the component is heated in step a) to a temperature below the Ac3 temperature, or even below the Ac1 temperature. The Ac1 temperature is the temperature at which the transformation from ferrite to austenite begins when a metal component, and in particular a steel component, is heated. The Ac3 temperature is the temperature at which the transformation from ferrite to austenite ends or has been (entirely) completed when a metal component, and in particular a steel component, is heated. Alternatively, the component can be heated in step a) to a temperature above the Ac3 temperature.

Preferably, the component is moved into a temperature control station after step a) and before step b). For this purpose, a transport unit may be provided, for example at least comprising a roller table and/or an (industrial) robot. Particularly preferably, the component is moved from a first furnace into a temperature control station. In particular, the component travels a distance of at least 0.5 m [meters] from the first furnace to the temperature control station. The component may be guided in contact with the ambient area or within a protective atmosphere.

According to an advantageous embodiment, it is proposed that the setting of the temperature difference in step b) takes place by cooling the at one first sub-region and/or heating the at least one second sub-region. Preferably, partial, active, conductive and/or convective cooling of the at least one first sub-region of the component takes place in step b), in particular in a temperature control station. After cooling, the component has partially differing (component) temperatures, wherein a temperature difference is set between a first temperature of the at least one first sub-region and a second temperature of the at least one second sub-region of the component. Moreover, it is possible to set several (different) temperature differences between sub-regions of the component in step b). It is possible, for example, to set three or more sub-regions in the component, each having a temperature different from the others.

Preferably, the setting of the temperature difference in step b) takes place in such a way that a (first) temperature of the at least one first sub-region of the component is lower than a (second) temperature of the at least one second sub-region of the same component. It is furthermore preferred when in step b) a temperature difference of at least 50 K, preferably of at least 100 K or even of at least 150 K is set between the at least one first sub-region and at least one second sub-region of the component. The first sub-region is generally a sub-region that is more ductile in the finished component or a sub-region that is given lower strength (compared to the second sub-region). The second sub-region is generally a sub-region that is comparatively harder in the finished component or a sub-region that is given higher strength (compared to the first sub-region).

If (active) cooling of the at one first sub-region is provided in step b), this preferably takes place by way of convection, and particularly preferably by means of at least one nozzle discharging a fluid. For this purpose, the nozzle may be disposed in the temperature control station and oriented toward the first sub-region. The fluid may be air, nitrogen, water or a mixture thereof, for example. The cooling preferably takes place by means of a nozzle array comprising multiple nozzles, each discharging a fluid, wherein particularly preferably the shape of the nozzle array and/or the arrangement of the multiple nozzles is adapted to the (desired) geometry of the at least one first sub-region of the component.

The at least one first sub-region preferably cools to a temperature below the Ac1 temperature in step b). The at least one first sub-region is particularly preferably cooled to a temperature below the Ac1 temperature in step b). Preferably, the at least one first sub-region is cooled in step b) to a temperature below 550° C. [degrees Celsius] (823.15 K), particularly preferably below 500° C. (773.15 K) or even below 450° C. (723.15 K).

In particular as an alternative or in addition to (active) cooling of the at one first sub-region, the temperature difference between the at least one first sub-region and the at least one second sub-region of the component can (also) be set by at least partially thermally insulating, separating, delimiting and/or partitioning off the at least one first sub-region. Preferably, the at least one first sub-region is at least partially thermally insulated, separated, delimited and/or partitioned off from the at least one second sub-region and/or from a heat source, such as an (electric) heating element, in particular by means of at least one cover, panel and/or partition. In particular when the at least one first sub-region of the component is not actively cooled, it is thus particularly preferred that in step b) at least a third sub-region of the component is actively cooled, for example by way of convection and/or conduction, and/or thermal energy is (actively) input into the at least one second sub-region of the component. In this way, (even) lower strength may be set in the third sub-region than in the first sub-region. Preferably, at least one third sub-region of the component is cooled in step b) by at least 50 K, preferably by at least 100 K or even by at least 150 K.

Preferably, in step b) an input of thermal energy into the at least one second sub-region of the component takes place, in particular in a temperature control station and/or simultaneously or at least partially simultaneously with an (active) cooling step or a passive cooling step or a step of allowing the at least one first sub-region of the component to cool. Preferably, the at least one second sub-region of the component is subjected during step b) and/or in the temperature control station (exclusively) to heat radiation, which is generated and/or irradiated, for example, by at least one electrically operated or heated heating element, which is disposed in particular in the temperature control station (and does not make contact with the component), such as a heating loop and/or a heating wire, and/or by at least one (gas-heated) radiant tube, which is, in particular, disposed in the temperature control station.

The input of thermal energy into the at least one second sub-region of the component can take place in such a way that a decrease in the temperature of the at least one second sub-region and/or a cooling rate of the at least one second sub-region is at least reduced during step b) and/or while the component remains in the temperature control station. This process control is in particular advantageous when the component was heated in step a) to a temperature above the Ac3 temperature. As an alternative, the input of thermal energy into the at least one second sub-region of the component in the temperature control station may take place in such a way that the at least one second sub-region of the component is heated (considerably), in particular by at least approximately 50 K. This process control is in particular advantageous when the component was heated in step a) to a temperature below the Ac3 temperature, or even below the Ac1 temperature.

Preferably, the component is moved into a second furnace after step b) and before step c). Particularly preferably, the component is moved (in this process) from the temperature control station into a second furnace. For this purpose, a transport unit may be provided, for example at least comprising a roller table and/or an (industrial) robot. The component preferably travels a distance of at least 0.5 m from the temperature control station to the second furnace. The component may be guided in contact with the ambient area or within a protective atmosphere. Preferably, the component is transferred directly into the second furnace immediately upon having been removed from the temperature control station.

After step b) and before step c), preferably at least the at least one first sub-region of the component is heated, in particular in a second furnace, preferably by at least 50 K, particularly preferably by at least 100 K or even by at least 150 K. As an alternative or in addition, at least a third sub-region of the component may be heated after step b) and before step c), in particular in a second furnace, preferably by at least 100 K, particularly preferably by at least 150 K or even by at least 200 K. If the at least one third sub-region is heated in addition to the at least one first sub-region being heated, these heating processes may take place simultaneously or at least partially simultaneously.

Particularly preferably, at least the at least one first sub-region or at least one third sub-region of the component is heated in the second furnace (exclusively) by way of radiant heat, for example by at least one electrically operated heating element (not making contact with the component), such as a heating loop and/or a heating wire, and/or by at least one (gas-heated) radiant tube. It is furthermore preferred that, in particular simultaneously or at least partially simultaneously with the heating of the at least one first sub-region and/or the at least one third sub-region, the at least one second sub-region of the component is heated in the second furnace by at least 50 K, particularly preferably by at least 70 K or even by at least 100 K, in particular (exclusively) by way of radiant heat. Particularly preferably, the at least one second sub-region of the component is heated in the second furnace to a temperature above the Ac1 temperature or even above the Ac3 temperature. Alternatively, and in particular simultaneously or at least partially simultaneously with the heating of the at least one first sub-region and/or the at least one third sub-region, a decrease in the temperature of the at least one second sub-region and/or a cooling rate of the at least one second sub-region is at least reduced while the component remains in the second furnace.

In other words, after step b) and before step c) an input of thermal energy, in particular by way of radiant heat, into the entire component may take place. For example, a second furnace may be provided for this purpose, which can include a furnace interior heatable (exclusively) by way of radiant heat, in which preferably a (substantially) uniform inside temperature can be set. The input of thermal energy into the at least one first sub-region of the component in the second furnace preferably takes place in such a way that the temperature of the at least one first sub-region is increased by at least 50 K, preferably by at least 100 K, particularly preferably by at least 150 K or even by at least 200 K. If at least one third sub-region is present, the input of thermal energy into the at least one third sub-region of the component in the second furnace preferably takes place in such a way that the temperature of the at least one third sub-region is increased by at least 100 K, preferably by at least 120 K, particularly preferably by at least 150 K or even by at least 200 K.

The input of thermal energy into the at least one second sub-region of the component in the second furnace can preferably take place in such a way that a decrease in the temperature of the at least one second sub-region and/or a cooling rate of the at least one second sub-region is at least reduced while the component remains in the second furnace. This process control is in particular advantageous when the component was heated in step a) to a temperature above the Ac3 temperature. As an alternative, the input of thermal energy into the at least one second sub-region of the component in the second furnace can take place in such a way that the at least one second sub-region of the component is at least (considerably) heated, in particular by at least 50 K, particularly preferably by at least 70 K or even by at least 100 K, and/or is heated to a temperature above the Ac1 temperature or even above the Ac3 temperature. This process control is in particular advantageous when the component was heated in step a) to a temperature below the Ac3 temperature, or even below the Ac1 temperature.

If a second furnace is provided, the component is preferably moved from the second furnace into the press hardening tool before step c). Preferably, the moving from the second furnace into the press hardening tool takes place by means of a transport device, for example at least comprising a roller table and/or a handling unit, in particular an (industrial) robot. Particularly preferably, the component travels a distance of at least 0.5 m from the second furnace to the press hardening tool. The component may be guided in contact with the ambient area or within a protective atmosphere. Preferably, the component is transferred directly into the press hardening tool immediately upon having been removed from the second furnace.

In step d), the at least one first sub-region of the component is (purely or exclusively) mechanically post-processed, in particular by way of trimming. The mechanical post-processing preferably includes at least severing, cutting, sawing, milling and/or planing.

Particularly preferably, mechanical cutting in and/or on the at least one first sub-region of the component takes place in step d). It is furthermore preferred when mechanical trimming of the component in the region of the at least one first sub-region takes place in step d). Preferably, the mechanical post-processing comprises stamping of the at least one first sub-region of the component. Particularly preferably, the post-processing, and in particular the trimming or stamping, takes place in such a way that a majority, in particular at least 70% or even at least 85%, of the first sub-region of the component is removed and/or severed from the (remaining) component. It is furthermore preferred when in step d) a chipless and/or adiabatic cutting operation, in particular of at least a majority, in particular at least 70% or even at least 85%, of the first sub-region of the component from the (remaining) component takes place. Adiabatic severing may, in particular, be understood to mean a high-speed plastic deformation in the severing zone here, which in particular results in strong heating, and thereby dissolution or softening of the microstructure. Due to the preferably high speed of the severing process, in particular (substantially) no heat transfer takes place into the material edge zone (of the severing zone).

According to an advantageous embodiment, it is proposed that the mechanical post-processing in step d) is carried out using at least one mechanical cutting tool. The mechanical cutting tool preferably comprises at least two severing means and/or cutting means movable (relative) toward and/or away from one another, such as blades or cutting edges. It is furthermore preferred that the cutting tool is manually guided and/or automatic steel shears. Particularly preferably, the cutting tool can be driven electrically, pneumatically and/or hydraulically.

According to an advantageous embodiment, it is proposed that the component is held in the press hardening tool during the mechanical post-processing operation. The mechanical post-processing preferably takes place while the component is held, clamped, chucked and/or pressed in the press hardening tool. Preferably, the mechanical post-processing takes place immediately after forming and/or cooling (carried out by the press hardening tool). In particular, the mechanical post-processing takes place in the press hardening tool.

According to a further advantageous embodiment, it is proposed that the at least one first sub-region of the component forms a flange region and/or a region for a recess. Preferably, at least one first sub-region forms a joining flange of the component. It is furthermore preferred that the at least one first sub-region forms an edge region of the component. Particularly preferably, the edge region extends around the entire component.

It is furthermore preferred that the at least one first sub-region forms at least one strip extending at least partially along an (outer) contour of the component or along an (outer) component edge.

The strip (proceeding from the (outer) component edge or proceeding from the (outer) contour) can extend at least 0.005 m [meters], preferably at least 0.01 m or even at least 0.1 m and/or up to 0.3 m, preferably up to 0.2 m or even up to 0.1 m, toward a center of the component. Transversely to the direction of extension, the strip can have a (homogeneous or inhomogeneous) strip width of preferably 0.05 m to 0.15 m, and particularly preferably of approximately 0.1 m, along the (outer) contour or along the (outer) component edge. The strip is preferably formed along the entire (outer) contour of the component or along the entire (outer) component edge. In this way, the component can be implemented with a more ductile component edge, which allows the (outer) contour of the component to be trimmed more easily.

According to a further aspect, a device for heat treating a metal component is disclosed, comprising at least the following:
  a heatable first furnace;
  at least one temperature control station, which is provided and configured for setting a temperature difference between at least one first sub-region and at least one second sub-region of the component;
  at least one press hardening tool; and
  at least one mechanical post-processing unit, which is assigned to the press hardening tool.

The first furnace can preferably be heated by way of radiant heat and/or convection. The device furthermore preferably comprises a heatable second furnace, which can be heated, in particular, by way of radiant heat and/or convection. It is particularly preferred when the second furnace is located downstream of the temperature control station. Moreover, it is preferred that the second furnace is provided and configured for heating at least the at least one first sub-region or at least one third sub-region of the component by at least 50 K, preferably by at least 100 K, particularly preferably by at least 150 K or even by at least 200 K.

According to a further advantageous embodiment, it is proposed that at least the first furnace or the second furnace is a continuous furnace or a batch furnace. Preferably, the first furnace is a continuous furnace, and in particular a roller hearth furnace. The second furnace is particularly preferably a continuous furnace, and in particular a roller hearth furnace, or a batch furnace, and in particular a multi-level batch furnace comprising at least two chambers disposed on top of one another.

The second furnace preferably includes a furnace interior, which in particular is heatable (exclusively) by way of radiant heat, in which preferably a (substantially) uniform inside temperature can be set. In particular when the second furnace is designed as a multi-level batch furnace, multiple such furnace interiors may be present corresponding to the number of chambers.

Preferably, (exclusively) radiant heat sources are disposed in the first furnace and/or in the second furnace. It is particularly preferred when at least one electrically operated heating element (not making contact with the component), such as at least one electrically operated heating loop and/or at least one electrically operated heating wire, is disposed in a furnace interior of the first furnace and/or in a furnace interior of the second furnace. As an alternative or in addition, at least one, in particular gas-heated, radiant tube may be disposed in the furnace interior of the first furnace and/or the furnace interior of the second furnace. Preferably, multiple radiant tube gas burners or radiant tubes into each of which at least one gas burner burns are disposed in the furnace interior of the first furnace and/or the furnace interior of the second furnace. It is particularly advantageous when the inner region of the radiant tubes into which the gas burners burn is atmospherically separated from the furnace interior, so that no combustion gases or exhaust gases can reach the furnace interior, and thus influence the furnace atmosphere. Such a system is also referred to as "indirect gas heating."

The temperature control station is preferably located downstream of the first furnace. At least one nozzle, which is provided and configured for discharging a fluid, may be disposed or held in the temperature control station. Preferably, the at least one nozzle is provided and configured for discharging a fluid for cooling the at least one first sub-region and/or at least one third sub-region of the component. In this way, a temperature difference can be particularly advantageously set between the at least one first sub-region or the at least one third sub-region and at least one second sub-region of the component. Particularly preferably, the at least one nozzle is oriented so as to be able to discharge the fluid toward the first sub-region and/or a third sub-region of the component. It is furthermore preferred that a nozzle array comprising multiple nozzles is disposed in the temperature control station, wherein each of the nozzles is provided and configured for discharging a fluid. Particularly preferably, a shape of the nozzle array and/or an arrangement of the multiple nozzles is adapted to the (desired) geometry of the at least one first sub-region and/or the at least one third sub-region of the component.

Preferably, at least one heating unit is disposed in the temperature control station. The heating unit is preferably provided and configured for inputting thermal energy into the at least one second sub-region of the component. Particularly preferably, the heating unit is disposed and/or oriented in the temperature control station in such a way that the input of thermal energy into the at least one second sub-region of the component can be carried out simultaneously, or at least partially simultaneously, with the cooling of the at least one first sub-region and/or at least one third sub-region of the component by means of the at least one nozzle. Preferably, the heating unit (exclusively) comprises at least one radiant heat source. Particularly preferably, the at least one radiant heat source is designed with at least one electrically operated heating element (not making (mechanical and/or electrical) contact with the component), such as at least one electrically operated heating loop and/or at least one electrically operated heating wire. As an alternative or in addition, at least one gas-heated radiant tube can be provided as the radiant heat source.

The press hardening tool is preferably located downstream of a second furnace. The press hardening tool is, in particular, provided and configured for simultaneously, or at least partially simultaneously, forming and (at least partially) cooling, and in particular quenching, the component.

The at least one mechanical post-processing unit is assigned to the press hardening tool. Preferably, the post-processing unit can be disposed or is disposed in the region of the press hardening tool. Particularly preferably, the post-processing unit can be oriented or is oriented toward the press hardening tool. It is furthermore preferred when the post-processing unit is connected, in particular electronically, mechanically, pneumatically, hydraulically and/or in terms of signaling, to the press hardening tool in such a way that the post-processing unit cooperates with the press hardening tool. The post-processing unit may represent a unit that is separate (from the press hardening tool) or may be at least partially integrated into the press hardening tool and/or be fixedly connected to the press hardening tool. For example, the post-processing unit may (for this purpose) comprise a post-processing tool, in particular a severing tool, a stamping tool and/or a cutting tool, which is preferably integrally formed or formed on or in the press hardening tool, in particular on an upper shell and/or a lower shell of the press hardening tool, or which is fixedly connected to the press hardening tool. A first portion of a post-processing tool, in particular a first blade, can be (directly and/or fixedly) connected to an upper shell of the press hardening tool and/or a second portion of a post-processing tool, in particular a second blade, can be (directly and/or fixedly) connected to a lower shell of the press hardening tool.

According to an advantageous embodiment, it is proposed that the at least one mechanical post-processing unit comprises at least one mechanical cutting tool.

The device is preferably used to carry out the method disclosed herein. According to an advantageous embodiment, it is proposed that the device is provided and configured for carrying out a method disclosed herein.

The details, features and advantageous embodiments described in connection with the method may also be present accordingly with the device disclosed herein, and vice versa. In this regard, all the comments provided there to further characterize the features are hereby incorporated by reference.

According to a further aspect, a use of a mechanical post-processing unit for (mechanically) trimming a metal component held in a press hardening tool is disclosed, wherein the component comprises at least one first sub-region having lower strength properties and at least one second sub-region having (comparatively) higher strength properties, and wherein the trimming (only) takes place in and/or on the at least one first sub-region.

The details, features and advantageous embodiments described in connection with the method and/or the device may also be present accordingly with the use disclosed herein, and vice versa. In this regard, all the comments provided there to further characterize the features are hereby incorporated by reference.

The invention and the technical environment will be described in more detail hereafter based on the figures. It should be noted out that the invention shall not be limited by the shown exemplary embodiments. In particular, it is also possible, unless explicitly described otherwise, to extract partial aspects of the subject matter described in the figures, and to combine these with other components and/or findings from other figures and/or the present description. In the schematic drawings.

Figure 1:
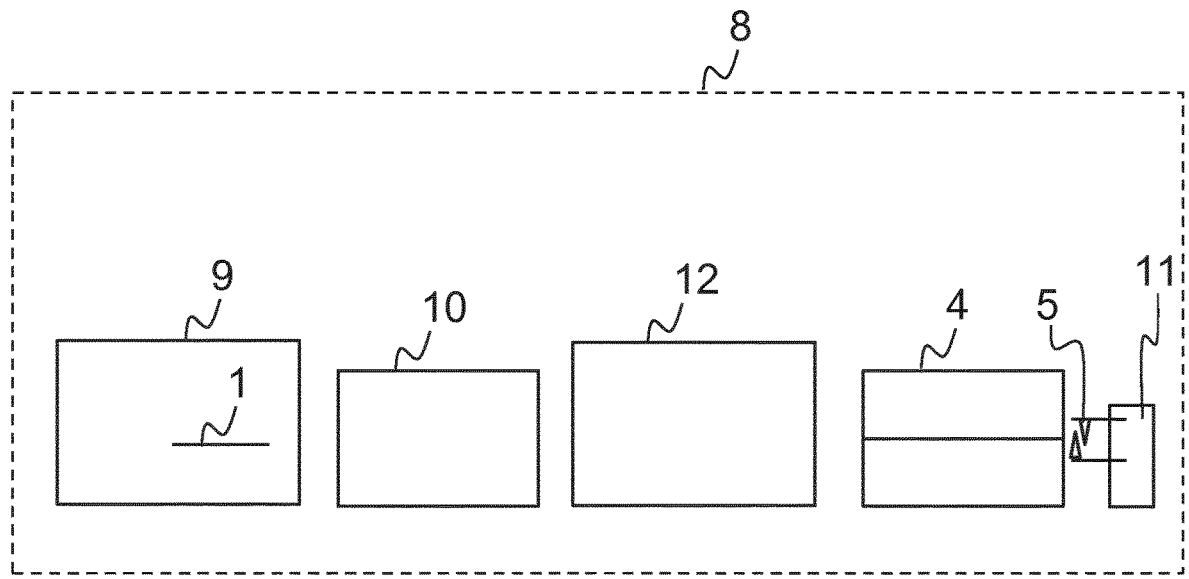
FIG. 1 shows a diagram of a device for heat treating a metal component.

FIG. 1 schematically shows a diagram of a device 8 for heat treating a metal component 1. The device 8 comprises a first furnace 9, a temperature control station 10, and a press hardening tool 4. By way of example, a second furnace 12 is provided between the temperature control station 10 and the press hardening tool 4. The device 8 represents a hot forming line for press hardening here. The temperature control station 10 is located (directly) downstream of the first furnace 9, so that a component 1 to be treated by means of the device 8 can be transferred directly into the temperature control station 10 upon leaving the first furnace 6. Furthermore, the second furnace 12 is located (directly) downstream of the temperature control station 10, and the press hardening tool 4 is located (directly) downstream of the second furnace 12.

The device shown in FIG. 1 furthermore comprises a mechanical post-processing unit 11, which is assigned to the press hardening tool 4. The mechanical post-processing unit 11 comprises a cutting tool 5, by way of which the metal component 1 can be at least partially trimmed.

Figure 2:
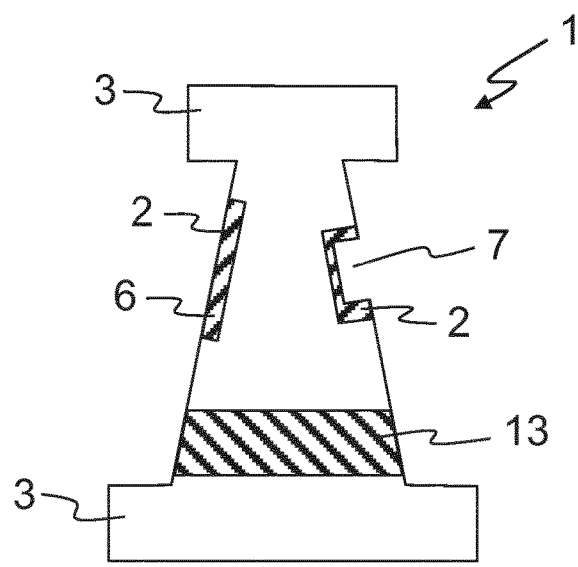
FIG. 2 shows a top view of a metal component.

FIG. 2 schematically shows a top view onto a metal component 1, comprising two first sub-regions 2 and two second sub-regions 3. Moreover, the component comprises a third sub-region 13 by way of example. The component 1 is shown in a state after the press hardening operation here. The component 1 is (fully martensitically) hardened in the second sub-regions 3. The component 1 thus has high strength in the second sub-regions 3. In contrast, the component 1 has lower strength in the first sub-regions. However, the component 1 has the lowest strength in the third sub-region 13. The third sub-region 13 can be used, for example, to absorb impact energy acting on the component 1.

According to the illustration of FIG. 2, one of the first sub-regions 2 of the component 1 forms a flange region 6, and a further of the first sub-regions 2 forms a region for a recess 7. Since the strength of the first sub-regions 2 is reduced compared to the (fully martensitically) hardened second sub-regions 3, the flange region 6 and the region for the recess 7 can be easily trimmed mechanically. In FIG. 2, the flange region 6 has not yet been mechanically post-processed. However, the region for the recess 7 has already been mechanically post-processed, so that the recess 7 is apparent in FIG. 2.

A method and a device for heat treating a metal component are provided, which at least partially solve the problems described with regard to the prior art. In particular, the method and the device allow a press hardened component having precise contours to as great an extent as possible to be produced in industrial series production. Moreover, the method and the device can be carried out or operated at the lowest energy costs possible and/or implemented or produced at the lowest investment costs possible. Moreover, the method and the device enable, in particular a short cycle time to as great an extent as possible.

LIST OF REFERENCE NUMERALS 1 component
2 first sub-region
3 second sub-region
4 press hardening tool
5 cutting tool
6 flange region
7 recess
8 device
9 first furnace
10 temperature control station
11 post-processing unit
12 second furnace
13 third sub-region

The invention claimed is:

1. A method for heat treating a metal component, comprising at least the following steps:
   a) heating the entire component in a first furnace;
   a1) moving the component from the first furnace to a temperature control station,
   b) within the temperature control station, thermally treating the component by subjecting at least one first sub-region to cooling and/or by subjecting at least one second sub-region to heating with a heating element so that the temperature control station affects a temperature difference between the at least one first sub-region and the at least one second sub-region of the component, the temperature difference between the at least one first sub-region and the at least one second sub-region not having been present prior to step b);
   b1) moving the component from the temperature control station to a second furnace,
   b2) heating at least the at least one first sub-region of the component in the second furnace,
   c) at least partially forming and/or cooling the component in a press hardening tool; and
   d) mechanically post-processing the at least one first sub-region of the component.

2. The method according to claim 1, wherein the component is heated in step a) by way of radiant heat and/or convection by at least 500 K.

3. The method according to claim 1, wherein the mechanical post-processing in step d) is carried out using at least one mechanical cutting tool.

4. The method according to claim 1, wherein the component is held in the press hardening tool during the mechanical post-processing operation.

5. The method according to claim 1, wherein the at least one first sub-region of the component forms a flange region and/or a region for a recess.

6. The method of claim 1, wherein the heating element is an electrically operated heating element.

7. The method of claim 1, wherein the cooling in the temperature control station is performed by at least one nozzle discharging a fluid.

* * * * *